(12) United States Patent
Imamura et al.

(10) Patent No.: US 12,071,046 B2
(45) Date of Patent: Aug. 27, 2024

(54) SEAT SLIDING DEVICE AND METHOD OF MANUFACTURING THE SEAT SLIDING DEVICE

(71) Applicant: TF-METAL Co., Ltd., Shizuoka (JP)

(72) Inventors: Takashi Imamura, Shizuoka (JP); Takuro Sato, Shizuoka (JP)

(73) Assignee: TF-METAL CO., LTD., Shizuoka (JP)

( * ) Notice: Subject to any disclaimer, the term of this patent is extended or adjusted under 35 U.S.C. 154(b) by 310 days.

(21) Appl. No.: 17/581,275

(22) Filed: Jan. 21, 2022

(65) Prior Publication Data

US 2022/0234477 A1 Jul. 28, 2022

(30) Foreign Application Priority Data

Jan. 22, 2021 (JP) ................. 2021-008671

(51) Int. Cl.
*B60N 2/06* (2006.01)
*B60N 2/07* (2006.01)
*B60N 2/08* (2006.01)

(52) U.S. Cl.
CPC ........... *B60N 2/067* (2013.01); *B60N 2/0705* (2013.01); *B60N 2/0875* (2013.01)

(58) Field of Classification Search
CPC ........ B60N 2/067; B60N 2/07; B60N 2/0705; B60N 2/072; B60N 2/0702; B60N 2/0715; B60N 2/0722; B60N 2/073; B60N 2/08; B60N 2/0818; B60N 2/0868; B60N 2/42; B60N 2/4214; B60N 2/4221; B60N 2/4228

USPC .................... 296/65.13–65.15; 248/429, 430
See application file for complete search history.

(56) References Cited

FOREIGN PATENT DOCUMENTS

| EP | 1033278 A3 | 7/2002 |
|---|---|---|
| JP | 2007290516 A | 11/2007 |
| JP | 2009-227152 A | 10/2009 |
| JP | 2009241698 A | 10/2009 |
| JP | 2018030475 A | 3/2018 |

OTHER PUBLICATIONS

Official Action issued on Oct. 28, 2023 in the counterpart Chinese application 2022100006670.9.

*Primary Examiner* — Dennis H Pedder
(74) *Attorney, Agent, or Firm* — Nath, Goldberg & Meyer; Jerald L. Meyer; Tanya E. Harkins

(57) ABSTRACT

In a pair of side walls of an upper rail, a pair of right and left slits extending from lower ends of the side walls to an intermediate position are formed. Right and left side edges of at least one reinforcing plate fit into the pair of left and right slits. The upper rail includes a pair of right and left tongue pieces formed on the side walls as to be positioned higher than the slits, and the reinforcing plate includes a pair of right and left recesses formed at the upper portions of the left and right side edges and with which the pair of right and left tongue pieces are engaged. The tongue-piece enters the recess in a state where an upper end surface abuts an upper tapered surface of the recess and is bent into an S-shape in the recess and engaged with the recess.

5 Claims, 9 Drawing Sheets

SEAT SLIDING DEVICE AND METHOD OF MANUFACTURING THE SEAT SLIDING DEVICE

CROSS REFERENCE TO RELATED APPLICATION

This application is based upon and claims the benefit of priority under 35U.S.C. § 119 from Japanese Patent Application No. 2021-008671 filed on Jan. 22, 2021, the entire contents of which are incorporated herein by reference.

TECHNICAL FIELD

The present invention relates to a seat sliding device and a method of manufacturing the seat sliding device.

BACKGROUND

In an electric seat sliding device, Japanese Patent Application Laid-Open No. 2009-241698 discloses a reinforcing plate provided inside an upper rail in order to prevent breakage of a gear box fixed to the upper rail when a large load acts on the upper rail. The reinforcing plate includes a projecting upper end fixed to a top wall of the upper rail by staking. In this case, a staked portion of the reinforcing plate projects from the top wall of the upper rail, which makes it difficult to be applied to a structure in which a mounting bracket on the seat side is directly fixed to the top wall of the upper rail by welding. Meanwhile, Japanese Patent Application Laid-Open No. 2018-30475 discloses a structure in which a reinforcing plate is attached to a side wall of an upper rail using an elastically deformable holding member, and European Patent No. 1033278 discloses a structure in which a side wall of an upper rail projects inward or is bent to fix a fixing element such as a nut to the upper rail.

SUMMARY

In Japanese Patent Application Laid-Open No. 2018-30475, when the reinforcing plate is attached to the upper rail, a separate component, which is the holding member, is used, which results in an increase in the number of components. In European Patent No. 1033278, a high-tension material (high-tensile steel) used for the upper rail has a large springback, and thus gap is easily generated. As a result, it is difficult to fix the reinforcing plate to the side wall of the upper rail without gap.

Accordingly, an object of the present invention is to prevent an increase in the number of components, and to allow a reinforcing member to be attached without gap by using the side wall of the upper rail.

A seat sliding device of the present invention includes: a lower rail extending along a front-rear direction of a vehicle body; an upper rail moving relative to the lower rail along a longitudinal direction of the lower rail; a screw shaft rotatably attached to the upper rail and extending along a direction of the relative movement; a nut member attached to the lower rail and screwed onto the screw shaft; and at least one reinforcing member attached to the upper rail and having a through-hole through which the screw shaft passes. The upper rail includes a pair of right and left engagement holes formed in a pair of right and left side walls and with which right and left side edges of the reinforcing member are engaged, and a pair of right and left locking-pieces formed on the pair of right and left side walls so as to be positioned higher than the engagement holes and in which an upper end surface enters within the upper rail. The reinforcing member includes a pair of right and left locking portions formed at lower portions of the right and left side edges and engaged with the pair of right and left engagement holes, and a pair of right and left recesses formed at upper portions of the right and left side edges and with which the pair of right and left locking-pieces are engaged. The locking-piece enters the recess in a state where an upper end surface abuts an inner side surface of the recess and is bent into an S-shape in the recess and engaged with the recess.

In a method for manufacturing a seat sliding device of the present invention, the seat sliding device includes: a lower rail extending along a front-rear direction of a vehicle body; an upper rail moving relative to the lower rail along a longitudinal direction of the lower rail; a screw shaft rotatably attached to the upper rail and extending along a direction of the relative movement; a nut member attached to the lower rail and screwed onto the screw shaft; and at least one reinforcing member attached to the upper rail and having a through-hole through which the screw shaft passes. The method includes a fitting step of fitting a locking portion formed in right and left side edges of the reinforcing member into a pair of right and left engagement holes formed in a pair of right and left side walls of the upper rail; and a pushing step of, in a pair of right and left locking-pieces formed on the pair of right and left side walls so as to be positioned higher than the engagement holes, pushing a vertically intermediate position of the locking-piece so as to push the locking-piece into a recess in a state where an upper end surface of the locking-piece abuts an upper side surface of the recess, whereby the locking-piece is bent into an S-shape in the recess and engaged with the recess subsequent to the fitting step.

The present invention makes it possible to prevent an increase in the number of components, and to allow a reinforcing member to be attached without gap by using the side wall of the upper rail.

DETAILED DESCRIPTION

Figure 1:
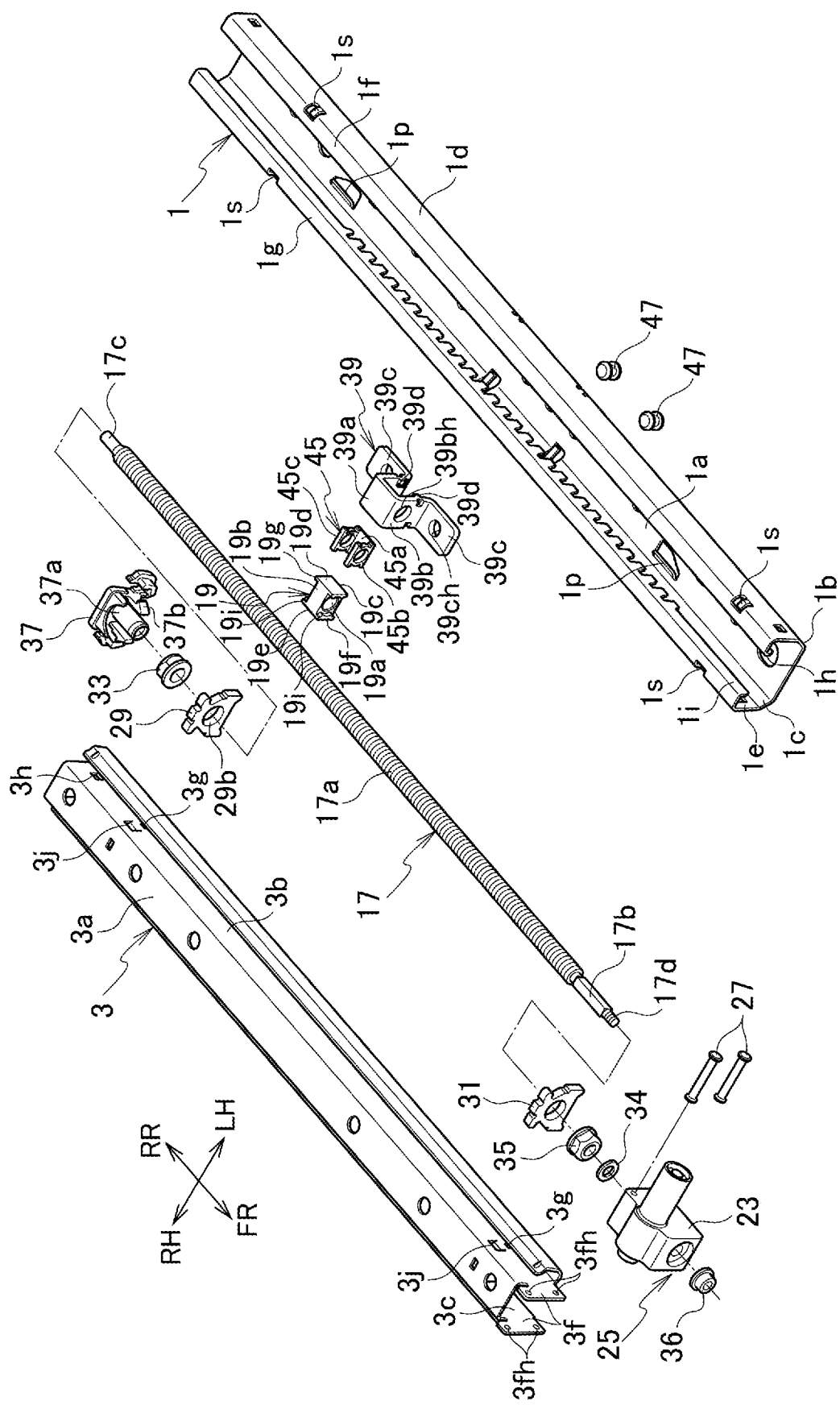
FIG. 1 is an exploded perspective view of a seat sliding device according to an embodiment of the present invention.

Embodiments of the present invention will be described below with reference to the drawings. In the drawings, a direction indicated by an arrow FR is the front of a vehicle body, a direction indicated by an arrow RR is the rear of a vehicle body, a direction indicated by an arrow LH is the left side of a vehicle body, and a direction indicated by an arrow RH is the right side of a vehicle body. In the following description, a "front-rear direction" and a "right-left direction" correspond to a "front-rear direction of a vehicle body" and a "right-left direction of a vehicle body" respectively, unless otherwise specified.

Figure 2:
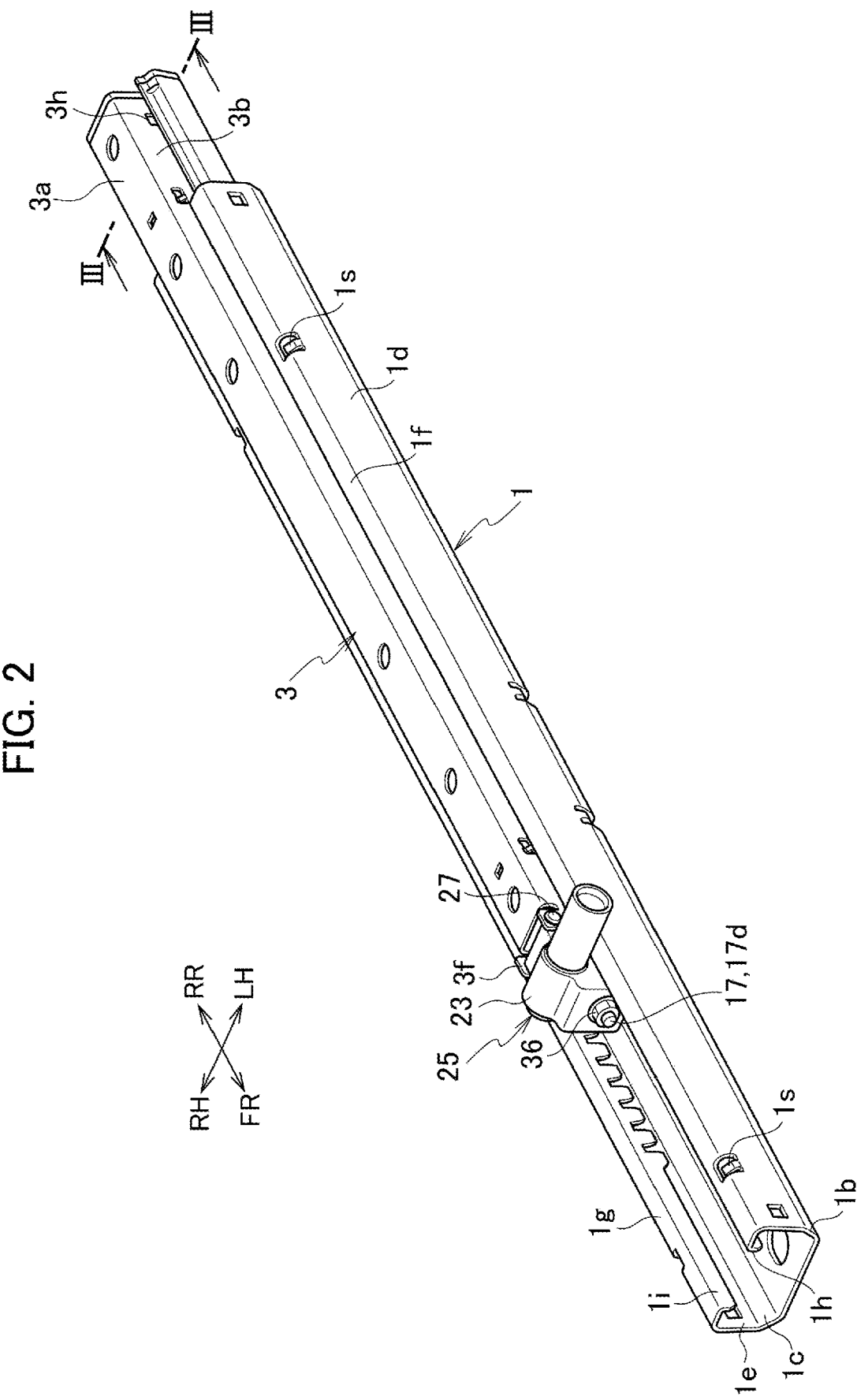
FIG. 2 is a perspective view of the seat sliding device according to the embodiment.

As shown in FIGS. 1 and 2, an electric seat sliding device mounted on an automobile is provided with a lower rail 1 fixed to a floor surface of a vehicle body and extending along a front-rear direction of the vehicle, and an upper rail 3 moving relative to the lower rail 1 along a longitudinal direction inside the lower rail 1. The upper rail 3 is attached to a lower surface of a seat (not shown). Accordingly, the seat, together with the upper rail 3, moves in a front-rear direction with respect to the lower rail 1 attached to the floor surface of the vehicle body. The lower rail 1 and the upper rail 3 constitute a rail body.

The lower rail 1 includes inclined walls 1b and 1c extending outward obliquely upward from both right and left ends of a bottom wall 1a. The lower rail 1 also includes right and left side walls 1d and 1e extending upward from upper ends of the inclined walls 1b and 1c. The lower rail 1 also includes upper walls 1f and 1g extending inward from the upper ends of the right and left side walls 1d and 1e, and inner walls 1h and 1i extending downward from inner ends of the upper walls 1f and 1g substantially parallel to the side walls 1d and 1e. In the lower rail 1, the bottom wall 1a is fixed to the floor surface of the vehicle body via a plurality of fixtures (not shown).

Figure 3:
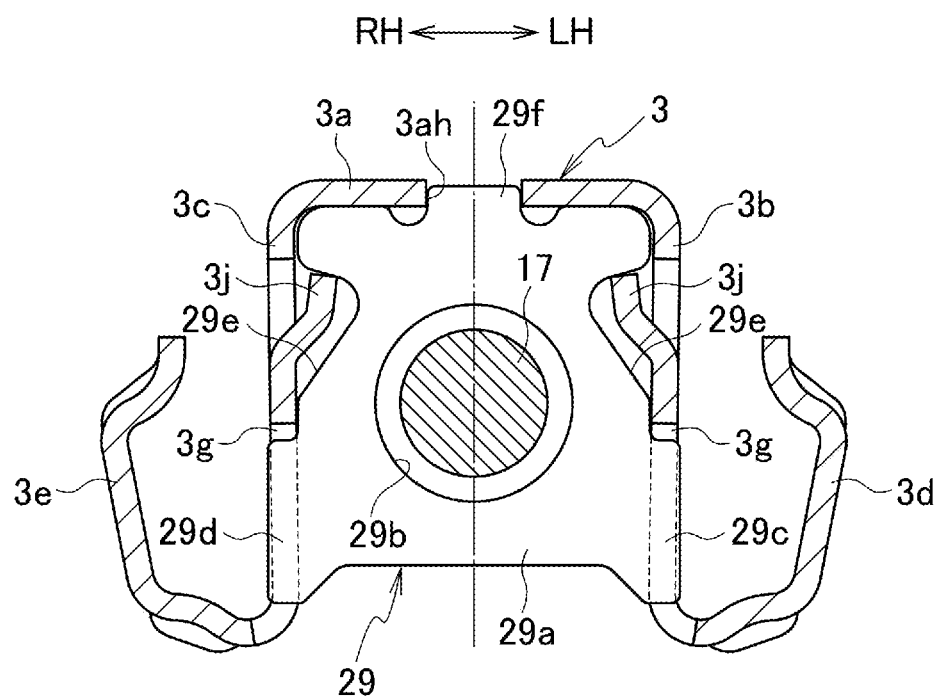
FIG. 3 is a cross-sectional view taken from line of FIG. 2.

As shown in FIG. 3, the upper rail 3 includes right and left side walls 3b and 3c extending downward from both right and left sides of a top wall 3a, and folded portions 3d and 3e bent outward from lower ends of the right and left side walls 3b and 3c. In the upper rail 3, the top wall 3a is fixed to the lower surface of the seat via a plurality of fixtures (not shown) on the seat side.

A lower guide ball and an upper guide ball (not shown) are rotatably stored between: a lower ball holding portion and an upper ball holding portion formed in the folded portions 3d and 3e of the upper rail 3; and the lower rail 1. The lower guide ball and the upper guide ball are supported by a ball retainer (not shown). When the upper rail 3 moves in a front-rear direction with respect to the lower rail 1, the lower guide ball and the upper guide ball rotate to suppress friction between the rails and enable smooth movement.

As shown in FIGS. 1 and 2, respective fixed stoppers 1s are formed on the right and left sides near the front and rear ends of the lower rail 1. The fixed stoppers 1s are engaged with the ball retainer to prevent the plurality of lower guide balls and the upper guide balls from being disengaged from the lower ball holding portion and the upper ball holding portion as well as a positional deviation in the front-rear direction.

A screw shaft 17 extending along a movement direction of the upper rail 3 is disposed inside the upper rail 3. The screw shaft 17 has almost the same length as the upper rail 3 and is supported by the upper rail 3. Meanwhile, a nut member 19 is attached to the bottom wall 1a slightly to the rear side of the longitudinal center of the lower rail 1. The nut member 19 includes a female screw 19a into which a male screw 17a of the screw shaft 17 is screwed. That is, when the screw shaft 17 rotates, the screw shaft 17 (upper rail 3) moves in the front-rear direction with respect to the nut member 19 (lower rail 1).

The screw shaft 17 is rotationally driven by a drive unit 25 having a motor (not shown) and a gear box 23. The drive unit 25 is attached to a pair of right and left mounting plates 3f formed on the front side end of the upper rail 3 in the longitudinal direction. The drive unit 25 is attached to the mounting plates 3f by mounting holes 3fh formed in the mounting plates 3f and by a fastener 27 (rivet, bolt nut, etc.).

As shown in FIG. 1, a serration 17b is formed at a front end of the screw shaft 17. The serration 17b is meshed with a worm wheel (not shown) rotatably supported in a gear box 23, so that the screw shaft 17 and the drive unit 25 are connected. Electric seat sliding devices except for a motor are provided at the right and left positions of the seat. An output shaft of a single motor provided in one of the electric seat sliding devices of the seat is connected to an input shaft (not shown) of the gear box 23 of the other electric seat sliding device by a connecting member (not shown). Thus, the screw shafts 17 of the right and left electric seat sliding devices are driven synchronously.

Reinforcing plates 29 and 31 as reinforcing members are attached to the front and rear sides of the upper rail 3. The reinforcing plates 29 and 31 are formed substantially in a plate shape orthogonal to the screw shaft 17, and attached inside the upper rail 3 so as to straddle between the right and left side walls 3b and 3c of the upper rail 3.

Figure 4:
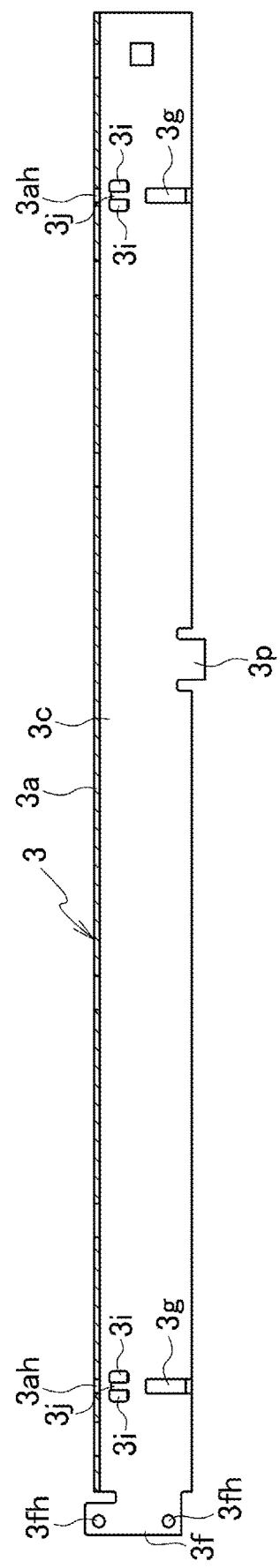
FIG. 4 is a side sectional view of an upper rail shown in FIG. 1.
Figure 5:
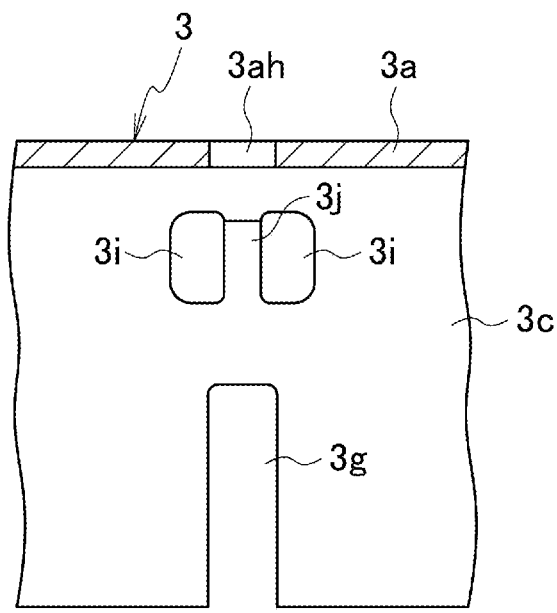
FIG. 5 is an enlarged view showing the periphery of a tongue-piece of the upper rail of FIG. 4.

A slit 3g is formed long in a vertical direction as shown in FIGS. 4 and 5. The slit 3g extends from the lower ends of the side walls 3b and 3c to a vertically intermediate position of the side walls 3b and 3c along a direction orthogonal to the longitudinal axis of the upper rail 3 (vertical direction).

As shown in FIGS. 4 and 5, a pair of holes 3i and 3i are formed in the right and left side walls 3b and 3c of the upper rail 3 so as to be positioned higher than the slits 3g. The pair of holes 3i and 3i are formed in the side walls 3b and 3c with an interval therebetween in the front-rear direction, and a bridging portion is formed between the pair of holes 3i and 3i. A tongue-piece 3j serving as a locking-piece is formed by separating an upper end of the bridging portion from the side walls 3b and 3c by shearing.

Figure 6:
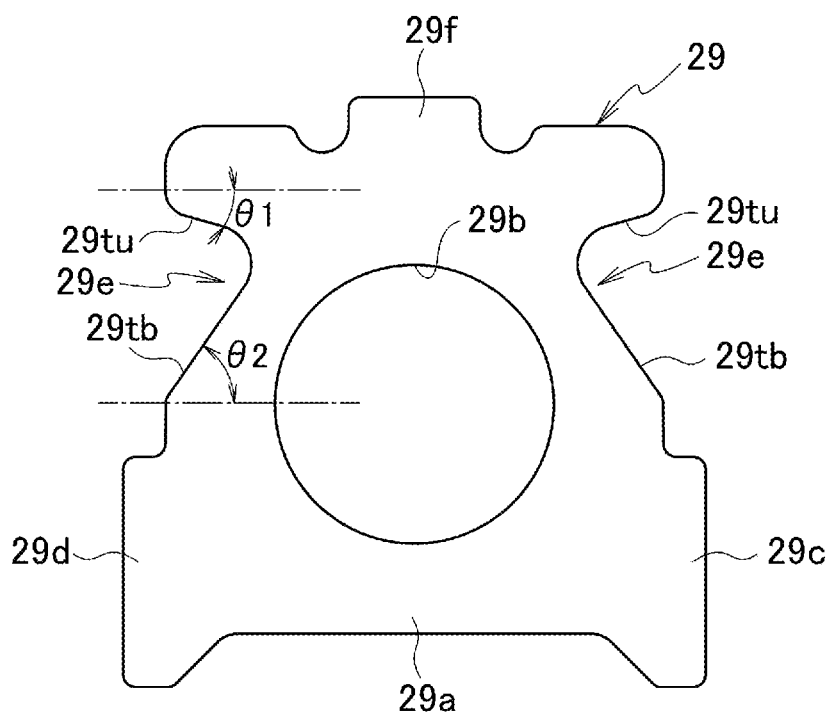
FIG. 6 is a front view of a reinforcing plate used in the seat sliding device of FIG.

FIG. 6 shows a rear reinforcing plate 29 of the two front and rear reinforcing plates 29 and 31 attached in the slits 3g. Since the two reinforcing plates 29 and 31 have the same shape, only the rear reinforcing plate 29 will be described hereinafter.

In the reinforcing plate 29, a through-hole 29b is formed in the center of a plate portion 29a and the screw shaft 17 is inserted into the through-hole 29b. An inner diameter of the through-hole 29b is larger than an outer diameter of the screw shaft 17. Accordingly, the screw shaft 17 is rotatable with respect to the reinforcing plate 29 in a state where the screw shaft 17 is inserted into the through-hole 29b. When the screw shaft 17 moves in the front-rear direction together with the upper rail 3 with respect to the nut member 19 (lower rail 1) by rotation, an upper rail projection 3p shown in FIG. 4 abuts a pair of front and rear lower rail projections 1p shown in FIG. 1. This restricts the upper rail 3 from moving in the front-rear direction.

As shown in FIG. 4, the upper rail projection 3p projects downward at a position slightly rearward of the center of the upper rail 3 in the front-rear direction. Upper rail projections 3p project downward continuing from the right and left side walls 3b and 3c by leaving portions between the right and left side walls 3b and 3c and the folded portions 3d and 3e unbent, and are formed on both the right and left sides. As shown in FIG. 1, the lower rail projections 1p provided in the front and the rear are formed by cutting and raising the bottom wall 1*a* of the lower rail 1 upward, and are formed on both the right and left sides corresponding to the right and left upper rail projections 3*p*.

A bearing nut 33 is disposed on the rear side of the rear reinforcing plate 29, and a bearing nut 35 is disposed on the front side of the front reinforcing plate 31. The bearing nuts 33 and 35 are lock nuts with some of threads crushed in advance. The bearing nuts 33 and 35 are screwed into a predetermined position of the male screw 17*a* of the screw shaft 17 and fixed thereto. With a state where a conventional nut is screwed into a predetermined position of the male screw 17*a* of the screw shaft 17, the nut may be fixed to the screw shaft 17 by means of staking by pushing a plurality of portions of the nut from the outer periphery of the nut toward the axial center.

When an impact load directed to the front of a vehicle body acts on the upper rail 3 due to a vehicle collision or the like, the reinforcing plate 31 at the front of the vehicle body moves to the front of the vehicle body, so that the reinforcing plate 31 collides with the bearing nut 35 at the front of the vehicle body. Accordingly, it is possible to prevent an impact load from being directly transmitted from the upper rail 3 to the gear box 23 connected to the upper rail 3. For this reason, this prevents an impact load which would separate the gearbox 23 from the screw shaft 17, caused by the transmission of the impact load to the gear box 23, from acting. At this time, a tensile force acts on the screw shaft 17.

When an impact load directed to the rear of the vehicle body acts on the upper rail 3, the reinforcing plate 29 at the rear of the vehicle body collides with the bearing nut 33 at the rear of the vehicle body. Accordingly, it is possible to prevent an impact load from being directly transmitted from the upper rail 3 to the gear box 23 connected to the upper rail 3. Thus, this prevents the gear box 23 from pushing the screw shaft 17, caused by the transmission of the impact load to the gear box 23. A tensile force also acts on the screw shaft 17.

With the screw shaft 17 disposed in the upper rail 3, a rear end 17*c* on the rear side is rotatably supported by a bearing portion 37*a* of an end cap 37. The end cap 37 is attached by engaging with engagement holes 3*h* formed in the side walls 3*b* and 3*c* of the upper rail 3. This attachment is performed by means of a pair of right and left engagement claws 37*b* provided so as to sandwich the bearing portion 37*a*. A male screw is formed at a front end 17*d* formed further forward than the serration 17*b* of the screw shaft 17. A washer 34 is inserted in contact with an end face of the male screw 17*a* of the screw shaft 17. As shown in FIG. 2, when the nut 36 is screwed onto the male screw, a worm wheel (not shown) in the gear box 23 is fixed so as to be sandwiched between the washer 34 (end surface of the male screw 17*a*) and the nut 36, and the screw shaft 17 is fixed in the axial direction to the worm wheel (not shown) in the gear box 23.

As shown in FIG. 6, in the reinforcing plate 29, lower locking portions (locking portions) 29*c* and 29*d* projecting outward in the right-left direction are formed at lower portions on both sides of the plate portion 29*a* in the right-left direction. The lower locking portions 29*c* and 29*d* are engaged with the slits 3*g* at the lower portions of the side walls 3*b* and 3*c* of the upper rail 3.

The reinforcing plate 29 has a recess 29*e* formed in upper portions of both sides of the plate portion 29*a* in the right-left direction, in such a way as to be recessed toward the inner side in the right-left direction. The recess 29*e* is engaged with the tongue-piece 3*j* formed in upper portions of the side walls 3*b* and 3*c* of the upper rail 3. An upper tapered surface 29*tu* inclining downward as moving inward in the right-left direction is formed on an upper side surface (upper inner surface) of the recess 29*e*, and a lower tapered surface 29*tb* inclining upward as moving inward in the right-left direction is formed on a lower side surface (lower inner surface) of the recess 29*e*. An inclination angle θ1 of the upper tapered surface 29*tu* with respect to a horizontal plane is set smaller than an inclination angle θ2 of the lower tapered surface 29*tb* with respect to the horizontal plane.

Further, the reinforcing plate 29 includes an upper locking portion 29*f* projecting upward from an upper end of the plate portion 29*a*. The reinforcing plates 29 and 31 are attached to an upper engagement hole 3*ah* formed in the top wall 3*a* of the upper rail 3 by fitting the upper locking portion 29*f* formed in an upper end into the upper engagement hole 3*ah* formed in the top wall 3*a* of the upper rail 3. The height of the upper locking portion 29*f* is set so as not to project upward from the top wall 3*a* of the upper rail 3.

Figure 7:
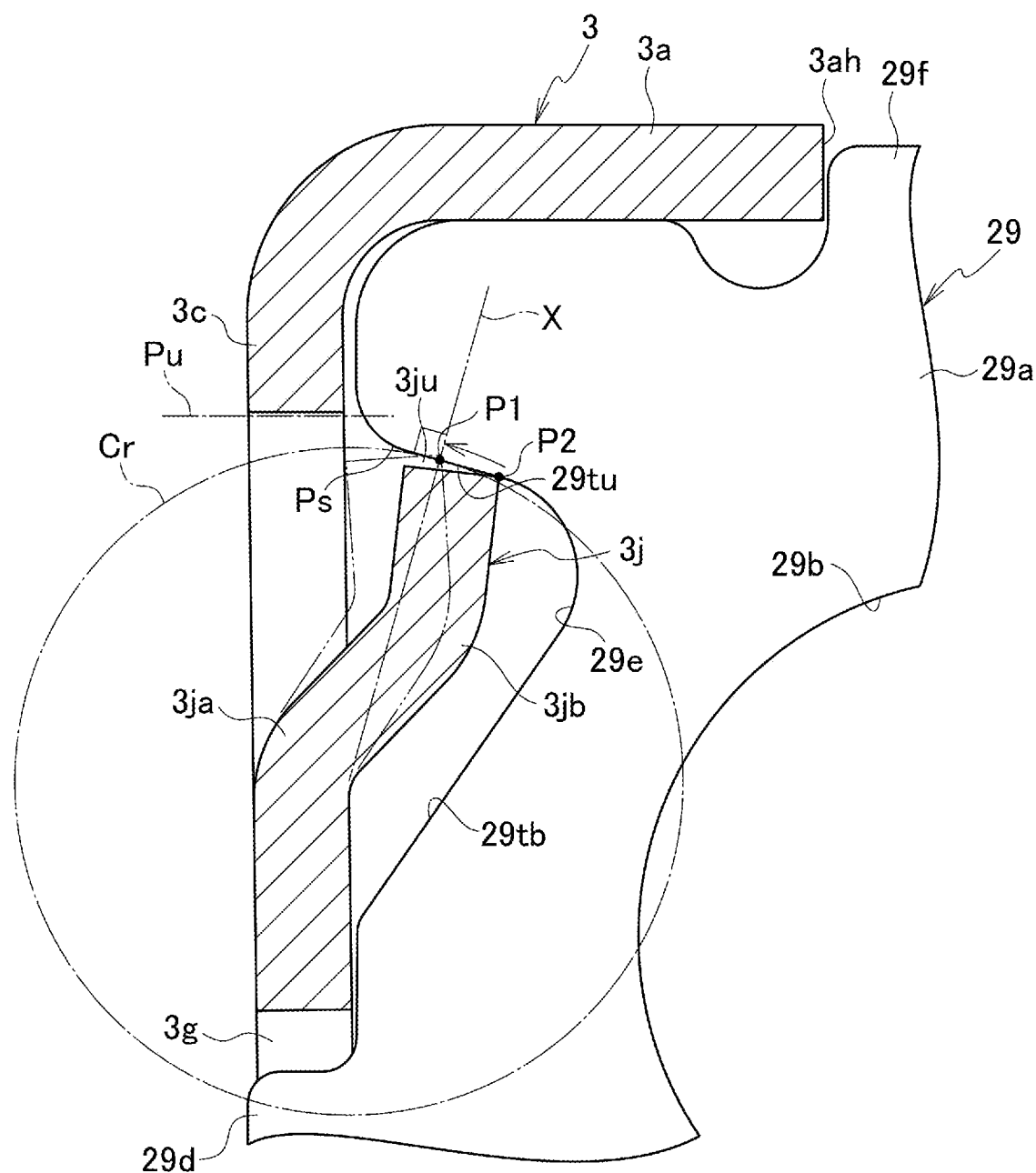
FIG. 7 is an enlarged view showing the periphery of the tongue-piece of the upper rail of FIG. 3.

As shown in FIG. 7, the upper rail 3 includes the tongue-piece 3*j* that engages with the recess 29*e* of the reinforcing plate 29. The tongue-piece 3*j* is formed on the pair of right and left side walls 3*b* and 3*c*. The tongue-piece 3*j* enters the recess 29*e* in a state where an upper end surface (tip surface) 3*ju* abuts the upper tapered surface 29*tu* of the recess 29*e*, and is bent into an S-shape in the recess 29*e* to be engaged with the recess 29*e*. The tongue-piece 3*j* includes a first bent portion 3*ja* bent inward in the right-left direction at a portion lower than a vertically intermediate portion (pushing position of a jig 40 described later), and a second bent portion 3*jb* bent to the opposite side to the bending direction of the first bent portion 3*ja*, at a portion higher than the vertically intermediate portion (pushing position of the jig 40 described later). In addition, the tongue-piece 3*j* is formed into an S-shape.

The upper end surface 3*ju* of the tongue-piece 3*j*, with respect to the upper tapered surface 29*tu*, enters the inner side in the right-left direction further than a position P1, which passes through a base end of the tongue-piece 3*j* and is orthogonal to the upper tapered surface 29*tu* of the recess 29*e*. In FIG. 7, a virtual line X passing through the base end of the tongue-piece 3*j* and orthogonal to the upper tapered surface 29*tu* of the recess 29*e* is shown with respect to an inner surface of the side walls 3*b* and 3*c*, and a corner portion P2 at the inner end of the upper end surface 3*ju* in the right-left direction enters the inner side in the right-left direction further than the virtual line X. In this state, the corner portion P2 of the tongue-piece 3*j* is positioned outside a circle Cr up to the position P1 centered on the base end of the tongue-piece 3*j*. Accordingly, the corner portion P2 of the tongue-piece 3*j* catches on the upper tapered surface 29*tu* of the recess 29*e*, and thus this prevents the corner portion P2 of the tongue-piece 3*j* from further moving outward in the right-left direction beyond the position P1.

After the tongue-piece 3*j* has been pushed by the jig 40, which will be described later, when the jig 40 is removed, the tongue-piece 3*j* bent into an S-shape tries to move outward in the right-left direction at the first bent portion 3*ja* due to elastic recovery (springback), while trying to move inward in the right-left direction at the second bent portion 3*jb*, and thus the tongue-piece 3*j* tries to return to being straight. Accordingly, the corner portion P2 of the tongue-piece 3*j* pushes up the upper tapered surface 29*tu* of the recess 29*e*, and thus this prevents the contact (engagement) between the upper end surface 3*ju* of the tongue-piece 3*j* and the upper tapered surface 29*tu* of the recess 29*e* from disengaging.

In order for the contact between the upper end surface 3*ju* of the tongue-piece 3*j* and the upper tapered surface 29*tu* of the recess 29*e* not to disengage while the tongue-piece 3*j* is pushed by the jig 40, an upper end position Pu before the tongue-piece 3*j* is pushed is set, a start position Pr of the upper tapered surface 29*tu* is set and an inclination angle θ1 of the upper tapered surface 29*tu* is set.

Figure 8A:
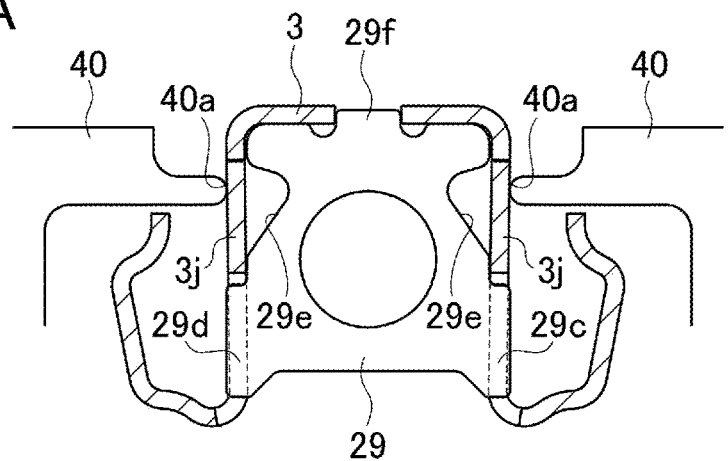
FIG. 8A is an explanatory diagram showing an operation sequence for attaching the reinforcing plate to the upper rail.

FIG. 8A, FIG. 8B, FIG. 8C, FIG. 8D and FIG. 8E show an operation sequence for attaching the reinforcing plate 29 to the upper rail 3. As shown in FIG. 8A, the reinforcing plate 29 is inserted into the slit 3*g* from the lower side of the upper rail 3. At this time, the upper locking portion 29*f* of the reinforcing plate 29 is fitted into the upper engagement hole 3*ah* and the lower locking portions 29*c* and 29*d* are fitted into the slit 3*g*. In this state, a staking process by the jig (pushing jig) 40 is performed. During the staking process, a vertically almost-intermediate portion of the tongue-piece 3*j* is pushed from both right and left sides in the horizontal direction by the jig 40, whereby the tongue-piece 3*j* is formed into an S-shape. In the jig 40, for example, an abutting surface 40*a* that abuts the tongue-piece 3*j* is formed in a cross-sectional arc shape in the vertical direction.

Figure 8B:
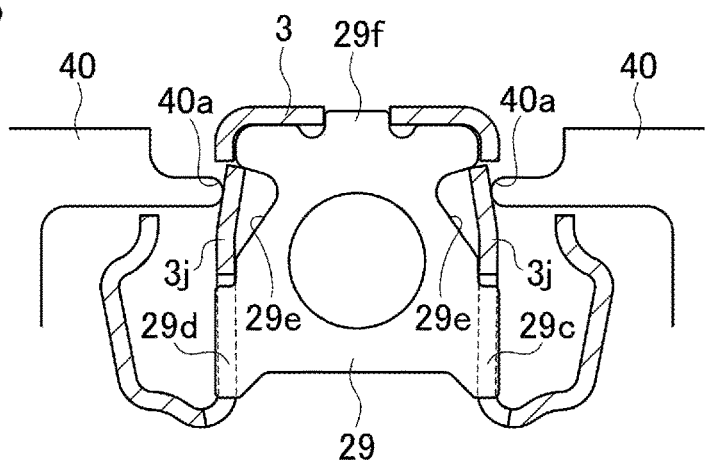
FIG. 8B is an explanatory diagram showing an operation sequence for attaching the reinforcing plate to the upper rail.
Figure 8C:
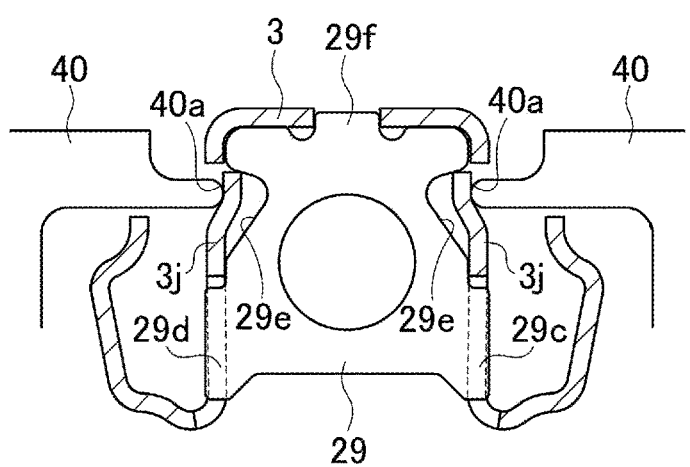
FIG. 8C is an explanatory diagram showing an operation sequence for attaching the reinforcing plate to the upper rail.
Figure 8D:
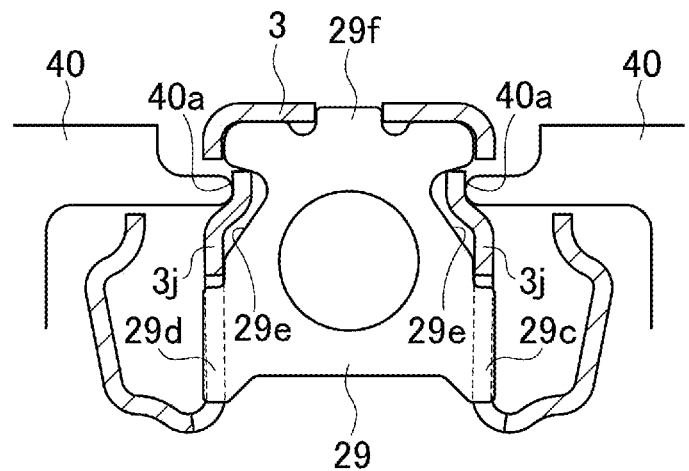
FIG. 8D is an explanatory diagram showing an operation sequence for attaching the reinforcing plate to the upper rail.

Here, as shown in FIG. 8B, FIG. 8C, and FIG. 8D, the jig 40 pushes a vertically almost-intermediate portion of the tongue-piece 3*j* so as to push the tongue-piece 3*j* to a predetermined position in the recess 29*e*. As a result, the first bent portion 3*ja* lower than the vertically intermediate portion (pushing position of the jig 40) is bent by being pushed inward in the right-left direction. Meanwhile, the upper end surface 3*ju* of the tongue-piece 3*j* is pushed while being maintained in contact with the upper tapered surface 29*tu*, and thus the second bent portion 3*jb* higher than the vertically intermediate portion (pushing position of the jig 40) is bent to the opposite side (outer side in the right-left direction) to the bending direction of the first bent portion 3*ja*.

Figure 8E:
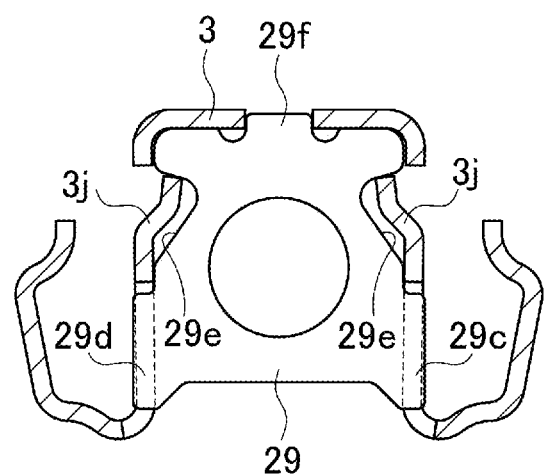
FIG. 8E is an explanatory diagram showing an operation sequence for attaching the reinforcing plate to the upper rail.

In this state, when the tongue-piece 3*j* is released from being pushed by the jig 40, as shown in FIG. 8E, the first bent portion 3*ja* of the tongue-piece 3*j* bent into an S-shape returns slightly outward in the right-left direction due to elastic recovery (springback), and the second bent portion 3*jb* returns slightly outward in the right-left direction due to elastic recovery (springback). In this state, a force acts in a direction in which the tongue-piece 3*j* pushes up the upper tapered surface 29*tu* of the recess 29*e*, thereby making it possible to attach the reinforcing plate 29 to the side walls 3*b* and 3*c* of the upper rail 3 without gap. The reinforcing plate 31 is attached to the upper rail 3 in the same manner as the reinforcing plate 29.

Further, the upper end surface 3*ju* of the tongue-piece 3*j*, with respect to the upper tapered surface 29*tu*, enters the inner side in the right-left direction further than the position P1, which passes through the base end of the tongue-piece 3*j* and is orthogonal to the upper tapered surface 29*tu* of the recess 29*e* (see FIG. 7). Accordingly, it is possible to prevent the upper end (tip portion) of the tongue-piece 3*j* from moving toward the opening side of the recess 29*e* (outer side in the right-left direction) and the tongue-piece 3*j* disengaging from the recess 29*e*.

Next, the attachment structure of the nut member 19 to the lower rail 1 will be described.

Figure 9:
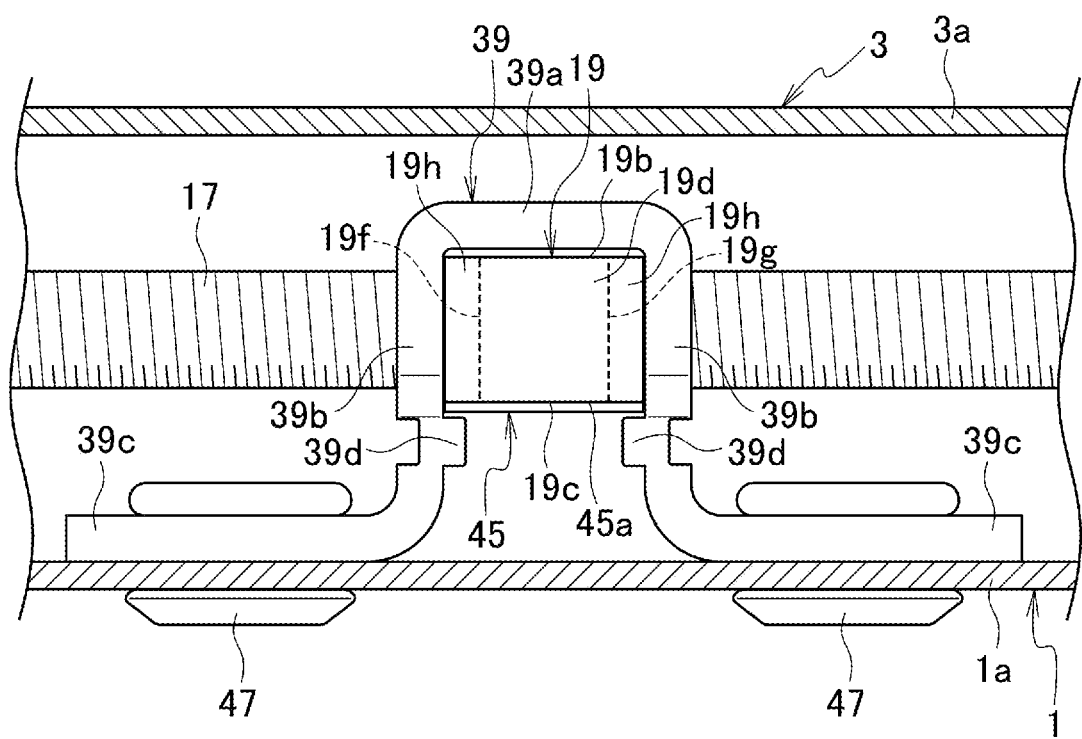
FIG. 9 is a sectional view showing an attachment state of a nut member used for the seat sliding device of FIG. 1.

As shown in FIG. 9, the nut member 19 is attached to the lower rail 1 by a bracket 39. The bracket 39 is fixed to the lower rail 1 so as to cover the upper side of the nut member 19. An elastic member 45 is interposed between the bracket 39 and the nut member 19. The elastic member 45 is made of an elastically deformable material such as rubber and is formed into a U-shape in a side view.

The nut member 19 includes an upper surface 19*b*, a lower surface 19*c*, a left side surface 19*d*, a right side surface 19*e*, a front surface 19*f* and a rear surface 19*g*, and is formed into a substantially rectangular parallelepiped shape as a whole. The female screw 19*a* is formed passing through between the front surface 19*f* and the rear surface 19*g* in the front-rear direction.

The respective restriction projections 19*h* projecting forward and backward are formed on the front surface 19*f* side and the rear surface 19*g* side of the left side surface 19*d*. The respective restriction projections 19*i* projecting forward and backward are formed on the front surface 19*f* side and the rear surface 19*g* side of the right side surface 19*e*. Each of the restriction projections 19*h* and 19*i* is formed over the entire length of the nut member 19 in the vertical direction. The restriction projections 19*h* and 19*i* are disposed so as to sandwich the elastic member 45 from both the right and left sides in a state where the elastic member 45 is mounted on the nut member 19.

The bracket 39 includes a flat portion 39*a* facing the upper surface 19*b* of the nut member 19, and a pair of wall surface portions 39*b* extending downward from both ends, in the front-rear direction, of the flat portion 39*a* and facing the front and rear surfaces of the nut member 19. The bracket 39 is provided with a pair of attachment surface portions 39*c* extending in directions mutually separating from the lower ends of the pair of wall surface portions 39*b* (front-rear direction).

An insertion hole 39*bh* into which the screw shaft 17 is inserted is formed in the wall surface portion 39*b*. An inner diameter of the insertion hole 39*bh* is larger than an outer diameter of the screw shaft 17. An anti-rotation projection 39*d* is formed on a portion lower than the insertion hole 39*bh* of the wall surface portion 39*b*. An attachment hole 39*ch* for attaching the bracket 39 to the bottom wall 1*a* of the lower rail 1 is formed in the attachment surface portion 39*c*.

The bracket 39 is formed of a metal plate, and as shown in FIG. 9, with the attachment surface portion 39*c* of the bracket 39 overlaid on the bottom wall 1*a* of the lower rail 1, a rivet is inserted as a fixture 47 into the insertion hole 39*ch* from the lower side, thereby fixing the bracket 39 by staking from the attachment surface portion 39*c* side.

As shown in FIG. 9, the elastic member 45 includes a damper lower surface 45*a* in contact with the lower surface 19*c* of the nut member 19. A damper front surface 45*b* and a damper rear surface 45*c* are formed extending upward from a front end edge and a rear end edge of the damper lower surface 45*a*, respectively. Damper through-holes penetrating in the front-rear direction are formed in the damper front surface 45*b* and the damper rear surface 45*c*. The screw shaft 17 is inserted into the damper through-holes. An inner diameter of the damper through-hole is larger than an outer diameter of the screw shaft 17 and is almost equal to that of the insertion hole 39*bh* of the bracket 39.

End edges of the damper front surface 45*b* and the damper rear surface 45*c* in the right-left direction are positioned further on the inner side in the right-left direction than the end edges of the damper lower surface 45*a* in the right-left direction. In other words, the respective end edges of the damper lower surface 45*a* on both the right and left sides project more outwardly in the right-left direction than the respective end edges of the damper front surface 45*b* and the damper rear surface 45*c* on both the right and left sides.

Next, the operation and effect of the present embodiment will be described.

(1) A seat sliding device of the present embodiment includes: a lower rail 1 extending along a front-rear direction of a vehicle body; an upper rail 3 moving relative to the lower rail 1 along a longitudinal direction of the lower rail 1; a screw shaft 17 rotatably attached to the upper rail 3 and extending along a direction of the relative movement; a nut member 19 attached to the lower rail 1 and screwed onto the screw shaft 17; and reinforcing plates 29 and 31 attached to the upper rail 3 and having a through-hole 29b through which the screw shaft 17 passes. The upper rail 3 includes a pair of right and left slits 3g formed in a pair of right and left side walls 3b and 3c and with which right and left side edges of the reinforcing plates 29 and 31 are engaged, and a pair of right and left tongue-pieces 3j formed on the pair of right and left side walls 3b and 3c so as to be positioned higher than the slits 3g and in which an upper end surface 3ju enters within the upper rail 3. The reinforcing plates 29 and 31 include a pair of right and left lower locking portions 29c and 29d formed at lower portions of the right and left side edges and engaged with the pair of right and left slits 3g, and a pair of right and left recesses 29e formed at upper portions of the right and left side edges and with which the pair of right and left tongue-pieces 3j are engaged. The tongue-piece 3j enters the recess 29e in a state where an upper end surface 3ju abuts an upper side surface of the recess 29e and is bent into an S-shape in the recess 29e and engaged with the recess 29e.

The tongue-piece 3j provided in the upper rail 3 is engaged with the recess 29e of the reinforcing plates 29 and 31 engaged with the slits 3g of the upper rail 3. The tongue-piece 3j enters the recess 29e in a state where the upper end surface 3ju abuts the upper side surface of the recess 29e, and is bent into an S-shape in the recess 29e and engaged with the recess 29e. Accordingly, the reinforcing plates 29 and 31 can be attached to the side walls 3b and 3c of the upper rail 3 without gap because a force acts in a direction pushing up the tongue-piece 3j.

(2) A pair of holes 3i and 3i are formed in the side walls 3b and 3c with an interval therebetween in the front-rear direction of the vehicle body, a bridging portion is formed between the pair of holes 3i and 3i, and the upper end surface 3ju of the tongue-piece 3j is formed by separating an upper end of the bridging portion from the side walls 3b and 3c.

The tongue-piece 3j structured in this manner makes it possible to form the tongue-piece 3j to be long.

(3) The upper side surface of the recess 29e is formed as an upper tapered surface 29tu inclining downward as moving inward in the right-left direction, and the upper end surface 3ju of the tongue-piece 3j, with respect to the upper tapered surface 29tu, enters an inner side in the right-left direction further than a position P1 that passes through a base end of the tongue-piece 3j and is orthogonal to the upper tapered surface 29tu of the recess 29e.

The tongue-piece 3j structured in this manner makes it possible to prevent the upper end (tip portion) of the tongue-piece 3j from moving toward the opening side of the recess 29e (outer side in the right-left direction) and the tongue-piece 3j disengaging from the recess 29e.

(4) A method for manufacturing a seat sliding device of the present embodiment includes: a fitting step of fitting lower locking portions 29c and 29d formed in right and left side edges of reinforcing plates 29 and 31 into a pair of right and left slits 3g formed in a pair of right and left side walls 3b and 3c of an upper rail 3; and a pushing step of, in a pair of right and left tongue-pieces 3j formed on the pair of right and left side walls 3b and 3c so as to be positioned higher than the slits 3g, pushing a vertically intermediate position of the tongue-piece 3j so as to push the tongue-piece 3j into a recess 29e in a state where an upper end surface 3ju of the tongue-piece 3j abuts an upper side surface of the recess 29e, whereby the tongue-piece 3j is bent into an S-shape in the recess 29e and engaged with the recess 29e subsequent to the fitting step.

The tongue-piece 3j provided in the upper rail 3 is engaged with the recess 29e of the reinforcing plates 29 and 31 engaged with the slits 3g of the upper rail 3. The tongue-piece 3j enters the recess 29e in a state where the upper end surface 3ju abuts the upper side surface of the recess 29e, and is bent into an S-shape in the recess 29e and engaged with the recess 29e. Even if springback of the tongue-piece 3j is generated after the pushing step, the reinforcing plates 29 and 31 can be attached to the side walls 3b and 3c of the upper rail 3 without gap because a force acts in the direction pushing up the tongue-piece 3j.

(5) In the pushing step, a jig 40 pushes a vertically intermediate portion of the tongue-piece 3j so as to push the tongue-piece 3j into the recess 29e, whereby the tongue-piece 3j is bent into an S-shape in the recess 29e and engaged with the recess 29e. The jig 40 has an abutting surface 40a that abuts the tongue-piece 3j, formed in a cross-sectional arc shape in the vertical direction.

When the jig 40 moves inward in the right-left direction to push the tongue-piece 3j, there is no concentration in stress even if the contact point with the tongue-piece 3j changes, thereby making it possible to prevent the tongue-piece 3j from breaking or being damaged.

Although the embodiments of the present invention have been described above, these embodiments are merely illustrative examples that have been described to facilitate understanding of the present invention, and the present invention is not limited to the embodiments. The technical scope of the present invention is not limited to the specific technical matters disclosed in the above embodiments, but also includes various modifications, alternations, alternative techniques, and the like which can be easily derived therefrom.

For example, although the screw shaft 17 is attached to the upper rail 3 and the nut member 19 is attached to the lower rail 1 in the above embodiment, the screw shaft 17 may be attached to the lower rail 1 and the nut member 19 may be attached to the upper rail 3. In this case, the reinforcing plates 29 and 31 are attached to the lower rail 1 side.

What is claimed is:

1. A seat sliding device comprising:
a lower rail extending along a front-rear direction of a vehicle body;
an upper rail moving relative to the lower rail along a longitudinal direction of the lower rail;
a screw shaft rotatably attached to the upper rail and extending along a direction of the relative movement;
a nut member attached to the lower rail and screwed onto the screw shaft; and
at least one reinforcing member attached to the upper rail and having a through-hole through which the screw shaft passes, wherein
the upper rail includes a pair of right and left engagement holes formed in a pair of right and left side walls and with which right and left side edges of the reinforcing member are engaged, and a pair of right and left locking-pieces formed on the pair of right and left side walls so as to be positioned higher than the engagement holes and in which an upper end surface enters within the upper rail, the reinforcing member includes a pair of right and left locking portions formed at lower portions of the right and left side edges and engaged with the pair of right and left engagement holes, and a pair of right and left recesses formed at upper portions of the right and left side edges and with which the pair of right and left locking-pieces are engaged, and the locking-piece enters the recess in a state where the upper end surface abuts an inner side surface of the recess and is bent into a shape bent inwardly and upwardly in the recess and engaged with the recess.

2. The seat sliding device according to claim 1, wherein a pair of holes are formed in the side walls with an interval therebetween in the front-rear direction of the vehicle body, a bridging portion is formed between the pair of holes, and the upper end surface of the locking-piece is formed by separating an upper end of the bridging portion from the side walls.

3. The seat sliding device according to claim 1, wherein the inner side surface of the recess is formed as a tapered surface inclining downward in the vertical direction as moving inward in the right-left direction, and the upper end surface of the locking-piece, with respect to the tapered surface, enters an inner side in the right-left direction further than a position that passes through a base end of the locking-piece and is orthogonal to the tapered surface of the recess.

4. A method for manufacturing a seat sliding device, the seat sliding device including:

a lower rail extending along a front-rear direction of a vehicle body;

an upper rail moving relative to the lower rail along a longitudinal direction of the lower rail;

a screw shaft rotatably attached to the upper rail and extending along a direction of the relative movement;

a nut member attached to the lower rail and screwed onto the screw shaft; and at least one reinforcing member attached to the upper rail and having a through-hole through which the screw shaft passes, wherein the method comprising:

a fitting step of fitting a locking portion formed in right and left side edges of the reinforcing member into a pair of right and left engagement holes formed in a pair of right and left side walls of the upper rail; and a pushing step of, in a pair of right and left locking-pieces formed on the pair of right and left side walls so as to be positioned higher than the engagement holes, pushing a vertically intermediate portion of the locking-piece so as to push the locking-piece into a recess in a state where an upper end surface of the locking-piece abuts an upper side surface of the recess, whereby the locking-piece is bent into a shape bent inwardly and upwardly in the recess and engaged with the recess subsequent to the fitting step.

5. The method for manufacturing a seat sliding device according to claim 4, wherein in the pushing step, a pushing jig pushes the vertically intermediate portion of the locking-piece so as to push the locking-piece into the recess, whereby the locking-piece is bent into the shape bent inwardly and upwardly in the recess and engaged with the recess, and the pushing jig has an abutting surface that abuts the locking-piece, formed in a cross-sectional arc shape in the vertical direction.

\* \* \* \* \*